US005697517A

United States Patent [19]

Holland-Letz

[11] Patent Number: 5,697,517

[45] Date of Patent: Dec. 16, 1997

[54] DISPENSING UNIT FOR BANKNOTES

[75] Inventor: Günter Holland-Letz, Paderborn, Germany

[73] Assignee: Siemens Nixdorf Informationssysteme Aktiengesellschaft, Paderborn, Germany

[21] Appl. No.: 704,688

[22] PCT Filed: Mar. 2, 1995

[86] PCT No.: PCT/DE95/00277

§ 371 Date: Sep. 16, 1996

§ 102(e) Date: Sep. 16, 1996

[87] PCT Pub. No.: WO95/25317

PCT Pub. Date: Sep. 21, 1995

[30] Foreign Application Priority Data

Mar. 16, 1994 [DE] Germany .......................... 44 08 981.3

[51] Int. Cl.[6] ........................................ B65G 59/00

[52] U.S. Cl. .................................. 221/9; 221/13; 902/16; 235/379

[58] Field of Search ............................ 221/9, 13; 902/16; 235/379

[56] References Cited

U.S. PATENT DOCUMENTS 3,767,080 10/1973 Rickson .................................. 221/13

FOREIGN PATENT DOCUMENTS 0 280 881 9/1988 European Pat. Off. .
0 542 226 5/1993 European Pat. Off. .
0 582 473 2/1994 European Pat. Off. .
34 34 780 3/1986 Germany .
37 06 808 9/1988 Germany .

*Primary Examiner*—Harold Pitts
*Attorney, Agent, or Firm*—Hill, Steadman & Simpson

[57] ABSTRACT

The invention relates to a dispensing unit for banknotes (42), comprising a banknote container (12) and a receiving module (14) which is in the form of the frame into which the banknote container (12) can be pushed. The unit includes an extracting and separating device for extracting banknotes (42) through an opening of the banknote container. The opening can be closed by a flap (26) and a closure plate (30). A retracting element (34) presses the banknotes against the extracting device by a force (P), before the flap is closed. The banknotes which are located in the banknote container are thereby forced away from the opening, back into the container interior. The retracting device is displaced in the direction of the extracting device (34) until the banknotes (42) come into the extracting position.

5 Claims, 1 Drawing Sheet

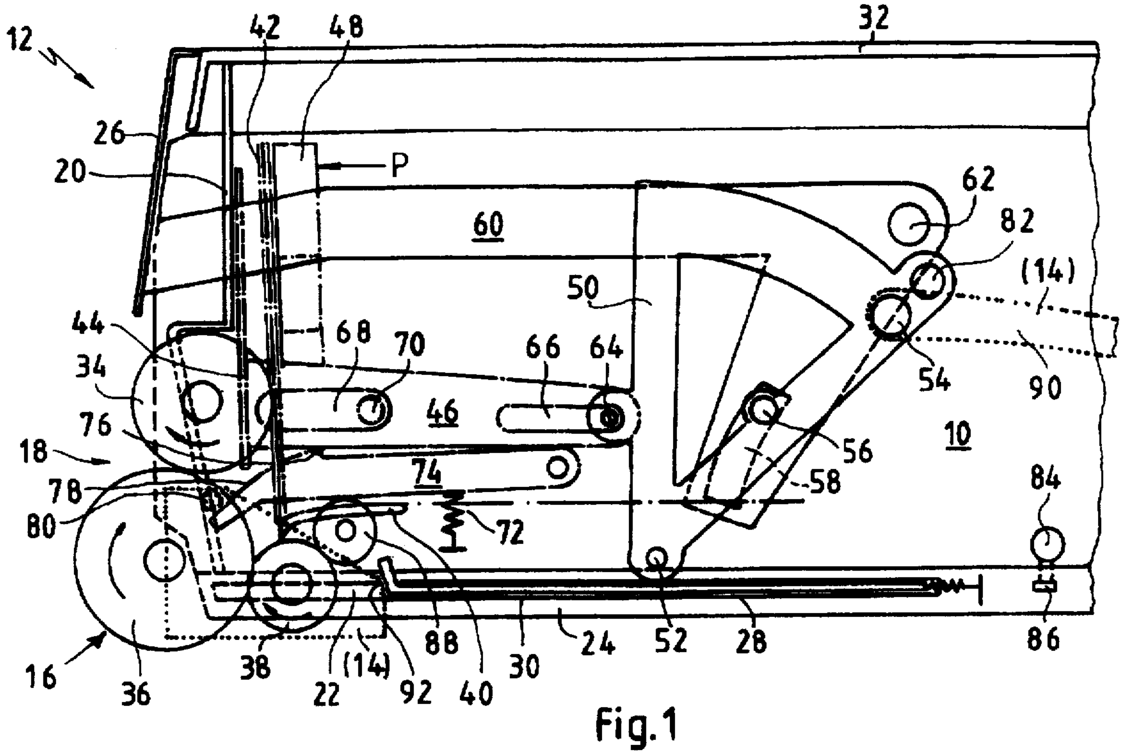
Fig.1
Fig.2
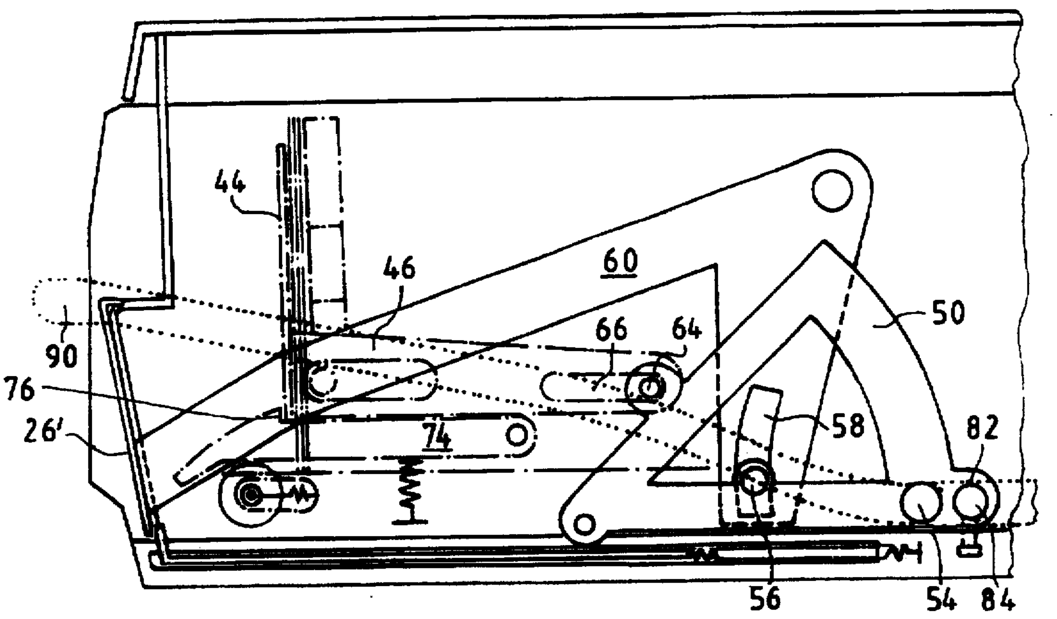

DISPENSING UNIT FOR BANKNOTES

BACKGROUND OF THE INVENTION

The invention relates to a banknote dispensing unit including a backnote container and a frame-like receiving module.

DE-A-3706808 discloses a dispensing unit which is intended for automatic banknote dispensers and in which banknotes are extracted upwards from a banknote container through an opening at its upper front edge. The opening can be closed by a flap, for which purpose the banknote container has a flap-actuating device which can be controlled in dependence on the displacement path of the banknote container in the receiving module. Furthermore, a retracting element is provided, and, when the banknote container is removed from the receiving module and before the flap is closed, the retracting element forces the banknotes which are located in the banknote container away from the opening, back into the container interior. Furthermore, the banknote container constructed in accordance with DE-A-3706808 also includes a pressing device which can be actuated by a motor, pressing the banknotes against the extracting device, and the construction of which can be gathered from DE-A-3434780.

The abovedescribed dispensing unit operates reliably as long as the banknotes are extracted upwards from the cassette. This is because, irrespective of the position of the retracting element, the banknotes are always located on their base and cannot drop out of the cassette. It is therefore also not possible for them to get jammed in between the flap and the housing upon closure of the cassette. The separating device, which generally comprises a transportation roller and a counteracting roller, may be arranged above the banknote container since, if too many banknotes are extracted and pushed back by the counteracting roller, they can drop back into the container.

If, however, the intention is for banknotes to be extracted downwards from the banknote container, other conditions apply: the separation device has to penetrate into the banknote container in order for banknotes which have been gripped in duplicate and pushed back remain in the container. When the banknote container is removed from the receiving module, the retaining force by which the extracting device retains the front banknotes in their position decreases. It is then possible for these banknotes to drop easily into the nip between the separation roller and the counteracting roller. If the flap then closes, then the banknotes which have dropped down get jammed in between said flap and the housing. This inevitably results in disruption to functioning when the cassette is reintroduced into a receiving module.

SUMMARY OF THE INVENTION

The object of the present invention is to provide a dispensing unit for banknotes in which the banknotes are drawn downwards from the banknote container through an opening at the lower front edge of the banknote container, and in which they are always retained securely within the banknote container when the latter is pushed into the receiving module or pushed out of the see.

This object is achieved by the present invention. The invention is based on the consideration that the banknotes may only pass into that region of the banknote container which, with the banknote container pushed into the receiving module, is occupied by the extracting device when the container is also actually located there. For this purpose, the invention runs through successive control steps: when the banknote container is pushed into the receiving module, over a first section of the displacement part, the flap is pivoted away from a first part of the opening. If the banknote container is then pushed further into the receiving module, then a closure plate which covers over the second part of the opening is also pushed away, with the result that the removal opening for the banknotes is fully opened. It is only when the entire displacement path is essentially being covered that a locking means which retains the retracting element in its retracted position is released, whereupon the retracting element is displaced by the pressing device located in the cassette, along with the stack of banknotes, in the direction of the extracting device until the banknotes come into their extracting position. As in the case of the prior art, when the banknote container is removed from the receiving module and before the flap is closed, the retracting element forces the banknotes located in the banknote container away from the opening, back into the container interior. This is achieved, in an embodiment of the invention, in that the retracting movement of the retracting element is positively coupled to the closure movement of the flap and is controlled such that the banknotes are drawn back from the extracting device before the flap has reached its closed position. This is achieved in that the flap-actuating device has a rocker which engages, by means of a guide peg fitted on it, into a control curve on the receiving module, and in that the rocker is connected in an articulated manner to a pivot lever fitted on the flap; the rocker engages, by means of a peg fitted on it, into a slot of a slotted-guide lever connected to the retracting element, such that, when the banknote container is drawn out of the receiving module, the peg draws the retracting element back and, when the banknote container is pushed in, the peg runs along in the slot without displacing the slotted-guide lever. This displacement only takes place in the abovedescribed manner by way of the pressing device.

In its position which corresponds to the closed flap, that is to say whenever the banknote container is located outside the receiving module, the rocker is secured against undesired pivoting by a locking bolt. When the banknote container is pushed into the receiving module, this locking bolt is unlocked by a control protrusion located on the receiving module. The result is that, when the banknote container is pushed further into the receiving module, the flap can be pivoted open in the abovedescribed manner.

According to an advantageous embodiment of the invention, the same flap-actuating devices are arranged on the two side walls of the banknote container. These interact with control curves which are of the same shape and are located on the side walls of the receiving module. This measure avoids twisting of the flap-actuating device, which could easily occur if the latter is arranged on one side only. It is thus possible for the flap-actuating device to be constructed much more easily.

Additional features and advantages of the present invention are described in, and will be apparent from, the detailed description of the preferred embodiments and from the drawings.

BRIEF DESCRIPTION OF THE DRAWINGS

FIG. 1 shows a banknote container pushed into a receiving module, and

FIG. 2 shows the banknote container outside the receiving module.

DETAILED DESCRIPTION OF THE PREFERRED EMBODIMENTS

For better understanding of the drawing, the selected mode of representation will be explained first of all: all the note-transporting rollers, since these are easily recognizable as such, are represented by solid lines. This mode of representation has also been selected for all visible parts, that is to say for those which are located in front of a side wall 10. In this arrangement, concealed parts are represented by broken lines. All the parts which are located behind the side wall in the interior of the banknote container 12 are depicted by chain-dotted lines and all the parts which are assigned to a receiving module 14 are depicted by dots.

FIG. 1 shows that part of a banknote container 12 which is in the vicinity of the removal opening, the banknote container having been pushed into a receiving module 14. A receiving opening 16 of the banknote container comprises an opening 18 in the front wall 20 and a cutout 22 which adjoins the latter and is located in the base 24 of the banknote container 12. The opening 18 can be closed by a pivotable flap 26. The cutout 22 can be closed by a closure plate 30 which can be displaced parallel to the base 24 in grooves 28. The banknote container 12 is closed towards the top by a cover, which is constructed as in the prior art in accordance with DE-A-3706808 and can be locked as is cited therein.

An extracting roller 34 which is associated with the receiving module 14 penetrates into the container 12 through the removal opening 16 and has arranged beneath it a separating device,-which comprises a transporting roller 36 and a counteracting roller 38.

Arranged in the interior of the banknote container 12, parallel to the base 24, is a banknote rest 40 on which a stack of banknotes 42 is placed, the banknotes standing on one edge.

Introduced between the banknotes 42 and the front wall 20 is a retracting element 44 which is in the form of a plate and is connected on its two sides to in each case one slotted-guide lever 46. Through-passages (not shown) for the extracting rollers 34 are cut out of the retracting element 44. A pressing plate 48 which belongs to a pressing device (which will not be outlined in any greater detail) is laid against the rear side of the stack of banknotes. The construction of the pressing device is described in detail in DE-A-3434780. In the drawing, the direction in which the pressing force acts is represented symbolically by an arrow designated by P.

On the side wall 10, a rocker 50 is retained pivotally on a bearing journal 52. A first peg 56 arranged on the rocker engages into a slot cutout 58 of a pivot lever 60, the flap 26 being fastened at that end of the pivot lever which is remote from slot cutout. The pivot lever 60 is mounted on the side wall 10 by means of a pivot bearing 62. A second peg 64 on the rocker 50 engages into a slot 66 which is remote from the retracting element 44 and is located in the slotted-guide lever 46. The slotted-guide lever 46 is mounted displaceably, by way of a further slot 68 parallel to the slot 66, on a peg 70 fitted on the side wall 10.

Fitted beneath the slotted-guide lever 46 is a locking lever 74 which can be pivoted counter to the force of a spring 72 and secures the retracting element 44 in its drawn-back position with the aid of a latching lug 75 (FIG. 2). That end of the locking lever 74 which is in the vicinity of the removal opening 16 is provided with a contour 78 which runs downwards in the form of an arc. When the banknote container 12 is pushed into the receiving module 14, said contour interacts with a carry-along member 80 which is fitted on the receiving module and displaces the locking lever 74 downwards into its unlocking position.

Formed in the rocker 50 is a catch 82 into which a locking bolt 84 which is mounted in the side wall 10 can engage. Said locking bolt 84 is connected to a control cam 86 which interacts with a control protrusion on the receiving module 14 when the banknote container is pushed into the receiving module. The locking bolt 84 is prestressed in the direction of the rocker 50 by a spring (not shown).

An aligning roller 88 is arranged beneath the banknote rest 40, in the vicinity of the counteracting roller 38 and parallel to the latter, such that the circumference of the aligning roller projects through apertures (not shown) in the banknote rest 40 and projects beyond the latter to a small extent. The aligning roller 88 extends essentially over the entire width of the banknotes. Grooves are provided at a distance apart from one another in its circumferential surface, with the result that the aligning roller 88 comprises a number of disks spaced apart one beside the other. It is produced from a soft and resilient, porous plastic with a high coefficient of friction.

The aligning ruler 88 is in drive connection with the counteracting roller 38 via a frictional-wheel or gear-wheel coupling. It consequently rotates in such a direction of rotation that its circumferential part which projects through the banknote rest 40 moves in the direction of the extracting roller 34. The lower edges of the banknotes which are located over it are thus moved in this direction.

As is known, financial institutions package banknotes in bundles which are held together by bands. As a result of this and of the bending of the bundle when the band is removed, the banknotes are often no longer planar, but are curved at the edges. If bundles of banknotes which have been bent in this way are placed in the banknote container such that their edges are oriented away from the extracting roller 34, this may result in disruption in the extracting operation because the lower edge of the banknote 42 does not come away from the banknote rest 40. The banknotes also show the same tendency to curve as a result of the gradual advancement of the stack of banknotes located in the banknote container in the direction of the extraction roller 34. In this arrangement, the lower edges of the banknotes are subject to friction on the banknote rest 40. This results in a restraining force acting on the lower edges of the banknotes. The aligning roller 88, then, counteracts this curvature, as a result of which the lower edges of the banknotes are pushed in the direction of the extracting roller 34. At the same time, the lower edges of the banknotes are loosened and adjacent banknotes are separated from one another. This assists the separating action of the counteracting roller 38.

The operations of introducing a banknote container 12 into the receiving module 14 and removing the same are described hereinbelow. FIG. 2 shows the banknote container 12 in a position in which it has just been introduced into the receiving module 14 by its front end. The guide peg 54 is located in the lower, straight part of a control curve 90, which is formed on a side wall of the receiving module 14, said side wall being located parallel to the side wall 10 of the container 12. A control protrusion (not shown) which is likewise fitted on said receiving module has pushed the locking bolt 84 out of the catch 82. If the banknote container 12 is then displaced to the left in FIG. 2, the guide peg 54 slides upwards along the control curve 90, as a result of which the rocker 50 pivots out of its horizontal position into an upright position. In this arrangement, the first peg 56 runs along in the slot cutout 58 and pivots the pivot lever 60 in the clockwise direction. On account of the geometry of this lever, the flap 26 is pivoted upwards into the position shown in FIG. 1 when it passes through a first section of the displacement path. The second peg 64 runs along in the slot 66 of the slotted-guide lever 46, until it has reached the left-hand border of said slot, without displacing the slotted-guide lever 46 in the process.

After a further section of the displacement path, the front upended portion of the closure plate 30 strikes against an edge 92 on the receiving module 14. As the banknote container is pushed further, this holds the closure plate 30 back, as a result of which the latter is pushed along in the groove 28 relative to the container 12 and thus releases the cutout 22 in the base 24 of the banknote container. After a further section of the displacement path, shortly before reaching the end position, the carry-along member 80 engages the contour 78 of the locking lever 74 and presses the latter downwards during the rest of the displacement path, with the result that the latching lug thereof releases the retracting element 44. The pressing force P can then bring the pressing plate 48, and, with this, the stack of banknotes, into the position shown in FIG. 1. Consequently, the retracting element 44 is also displaced into the position shown in FIG. 1, with the result that the extracting roller 34 can grip the front banknote 42. The second peg 64 passes to the right-hand border of the slot 66 in this process.

When the banknote container 12 is drawn out of the receiving module 14, the abovedescribed movement procedures take place in the reverse order. The guide peg 54 of the rocker 50 once again follows the control curve 90, as a result of which the rocker is pivoted to the right. The second peg 64 can engage directly on the slotted-guide lever 46, as a result of which the retracting element is forced back again into the position shown in FIG. 2. On account of the lever geometry, the stack of banknotes has thus been displaced away from the removal opening 16, into the container interior. At no time in this procedure are the banknotes out of contact with the forces which hold them together. This thus ensures that, even after the banknote container 12 has been removed from the receiving module 14, the banknotes 42 are positioned on the banknote rest 40 in an ordered manner.

Various changes and modifications to the presently preferred embodiments will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. A dispensing unit for banknotes, the dispensing unit comprising a banknote container in the form of a box and a receiving module which is in the form of a frame into which the banknote container can be pushed and which has an extracting and separation device for extracting banknotes downwards through an opening of the banknote container;

the opening being at least partially closable by a flap of the banknote container by a flap-actuating device which is controllable in dependence on a displacement path of the banknote container in the receiving module;

the banknote container including a retracting element arranged such that when the banknote container is removed from the receiving module and before the flap is closed, said retracting element forces the banknotes located in the banknote container away from the opening, back into the container interior;

the banknote container including a pressing device actuatable by a motor for pressing the banknotes against the extracting and separating device;

the flap-actuating device having a pivotable rocker with a guide peg, and a pivot lever which bears the flap, the pivotable rocker and pivot lever being coupled to one another via a slotted-guide control means;

the unit being arranged such that, when the banknote container is pushed into the receiving module, the guide peg (54) fastened on the rocker engages a control curve disposed on a side wall of the receiving module and pivots the rocker over a first section of the displacement path, causing the flap to pivot away from a first, upper part (18) of the opening (16)

the banknote container including a closure plate which is displaceable between a position in which it closes a second, lower part of the opening and a position in which it releases the same, the receiving module having an edge which projects into a displacement path of the closure plate and restrains the closure plate over a second section of the displacement path of the banknote container in the receiving module, causing the lower part of the opening to be released, the banknote container including a locking lever which retains the retracting element in a retracted position, the receiving module including a carry-along element which, over the rest of the displacement path of the banknote container in the receiving module, adjusts the locking lever into a position in which the locking lever releases the retracting element, whereupon the retracting element is displaceable by the pressing device a direction of the extracting device to such an extent that the banknotes are placed in an extracting position.

2. The dispensing unit as claimed in claim 1, wherein the retracting movement of the retracting element is positively coupled to the closure movement of the flap and is controlled such that banknotes located in the banknote container are drawn back from the extracting device before the flap has reached its closed position.

3. The dispensing unit as claimed in claim 1, wherein the rocker has a peg (64) fitted thereon which engages into a slot of a slotted-guide lever connected to the retracting element, such that, when the banknote container is drawn out of the receiving module, the peg draws the retracting element back, and when the banknote container is pushed in, the peg runs along in the slot without displacing the slotted-guide lever.

4. The dispensing unit as claimed in claim 3, wherein the rocker is locked by a locking bolt a position which corresponds to the closed flap, and wherein the locking bolt has a control cam which can be actuated in the unlocking direction by a control protrusion on the receiving module.

5. The dispensing unit as claimed in claim 3, wherein the said rocker and pivot lever are arranged on the two side walls of the banknote container, and the control curve is arranged on the inner walls of the receiving module, said inner walls facing the side walls of the banknote container.

* * * * *